United States Patent
McMeekin et al.

(10) Patent No.: US 9,819,446 B2
(45) Date of Patent: Nov. 14, 2017

(54) DYNAMIC AND FLEXIBLE CHANNEL SELECTION IN A WIRELESS COMMUNICATION SYSTEM

(71) Applicant: FreeWave Technologies, Inc., Boulder, CO (US)

(72) Inventors: Steven E. McMeekin, Evergreen, CO (US); Timothy G. Mester, Longmont, CO (US); Gregory J. Veintimilla, Boulder, CO (US)

(73) Assignee: FreeWave Technologies, Inc., Boulder, CO (US)

( * ) Notice: Subject to any disclaimer, the term of this patent is extended or adjusted under 35 U.S.C. 154(b) by 28 days.

(21) Appl. No.: 14/924,349

(22) Filed: Oct. 27, 2015

(65) Prior Publication Data

US 2016/0127953 A1    May 5, 2016

Related U.S. Application Data

(60) Provisional application No. 62/072,285, filed on Oct. 29, 2014.

(51) Int. Cl.
| | |
|---|---|
| *H04W 72/00* | (2009.01) |
| *H04L 1/00* | (2006.01) |
| *H04W 52/24* | (2009.01) |
| *H04W 52/02* | (2009.01) |
| *H04B 17/10* | (2015.01) |

(Continued)

(52) U.S. Cl.
CPC ......... *H04L 1/0042* (2013.01); *H04B 17/102* (2015.01); *H04B 17/18* (2015.01); *H04B 17/345* (2015.01); *H04W 52/0206* (2013.01); *H04W 52/241* (2013.01); *H04W 52/243* (2013.01); *H04L 1/0003* (2013.01); *Y02B 60/50* (2013.01)

(58) Field of Classification Search
CPC ... H04W 72/04; H04W 74/006; H04W 52/14; H04W 72/1289; H04W 72/1273; H04W 52/24; H04W 72/0453; H04W 52/241; H04W 52/243; H04W 52/0206; H04M 7/16; H04B 1/005; H04B 17/102; H04B 17/18; H04B 17/345; H04L 1/0042; H04L 1/0003; Y02B 60/50
USPC .......... 455/422.1, 450–453, 456.2, 464, 509, 455/510; 370/395.41, 332
See application file for complete search history.

(56) References Cited

U.S. PATENT DOCUMENTS

| | | |
|---|---|---|
| 5,488,632 A | 1/1996 | Mason et al. |
| 7,359,311 B1 | 4/2008 | Paranjpe et al. |

(Continued)

OTHER PUBLICATIONS

Non-Final Office Action from co-pending U.S. Appl. No. 14/924,309 dated Jun. 1, 2017; 33 pages.

(Continued)

*Primary Examiner* — Dominic Rego

(57) ABSTRACT

A method for operating a downlink transmitter radio to automatically determine transmission parameters includes monitoring the spectral content of a range of frequencies, and identifying, based on the monitored spectral content, spectral characteristics associated with noise or interference. The downlink transmission channel carrier frequency and channel frequency bandwidth are determined based on the spectral characteristics of the interference together with operating requirements of the wireless transmission system.

16 Claims, 5 Drawing Sheets

(51) Int. Cl.
*H04B 17/18* (2015.01)
*H04B 17/345* (2015.01)

(56) References Cited

U.S. PATENT DOCUMENTS

| | | | |
|---|---|---|---|
| 7,746,896 B2 * | 6/2010 | Venkatachalam | H04L 29/12839 370/346 |
| 8,509,711 B1 * | 8/2013 | Bagley | H04B 1/525 455/103 |
| 8,787,873 B1 | 7/2014 | Hitt et al. | |
| 9,117,457 B2 | 8/2015 | Kwan et al. | |
| 9,628,141 B2 | 4/2017 | Wyss et al. | |
| 2002/0146994 A1 | 10/2002 | Marrah et al. | |
| 2003/0176161 A1 * | 9/2003 | Dale | H04L 1/0003 455/3.01 |
| 2003/0210663 A1 * | 11/2003 | Everson | H04W 28/06 370/329 |
| 2006/0074558 A1 | 4/2006 | Williamson et al. | |
| 2006/0171335 A1 * | 8/2006 | Yuen | H04W 36/06 370/255 |
| 2006/0256884 A1 | 11/2006 | Tomioka et al. | |
| 2008/0089443 A1 | 4/2008 | Sanada et al. | |
| 2008/0107079 A1 * | 5/2008 | Bae | H04W 76/02 370/331 |
| 2009/0040937 A1 | 2/2009 | Xhafa et al. | |
| 2009/0225741 A1 | 9/2009 | Wang et al. | |
| 2009/0253387 A1 * | 10/2009 | Van Rensburg | H01Q 3/40 455/90.2 |
| 2009/0258665 A1 * | 10/2009 | Bourlas | H04L 1/0003 455/522 |
| 2009/0298522 A1 * | 12/2009 | Chaudhri | H04W 16/14 455/509 |
| 2009/0303918 A1 | 12/2009 | Ma et al. | |
| 2010/0226491 A1 | 9/2010 | Conte et al. | |
| 2010/0311452 A1 * | 12/2010 | Li | H04W 72/08 455/509 |
| 2011/0122831 A1 * | 5/2011 | Kim | H04B 1/28 370/329 |
| 2012/0184284 A1 * | 7/2012 | Moisio | H04W 48/16 455/452.1 |
| 2012/0230453 A1 | 9/2012 | Shih et al. | |
| 2013/0003674 A1 * | 1/2013 | Lin | H04W 16/14 370/329 |
| 2013/0051293 A1 * | 2/2013 | Wentink | H04W 52/0216 370/311 |
| 2013/0102305 A1 * | 4/2013 | Liu | H04W 24/02 455/422.1 |
| 2013/0215219 A1 * | 8/2013 | Hefeeda | H04L 65/4076 348/42 |
| 2013/0265915 A1 * | 10/2013 | Choi | H04W 72/12 370/280 |
| 2014/0119216 A1 * | 5/2014 | Patel | H04W 52/24 370/252 |
| 2014/0153625 A1 * | 6/2014 | Vojcic | H04L 1/005 375/224 |
| 2014/0221028 A1 | 8/2014 | Desai et al. | |
| 2014/0247800 A1 * | 9/2014 | Ro | H04W 24/08 370/329 |
| 2014/0254639 A1 * | 9/2014 | Tahir | H04W 52/42 375/219 |
| 2014/0341133 A1 * | 11/2014 | Wang | H04L 5/00 370/329 |
| 2015/0092761 A1 * | 4/2015 | Kim | H04L 1/0025 370/336 |
| 2015/0117227 A1 | 4/2015 | Zhang et al. | |
| 2015/0124688 A1 | 5/2015 | Xu et al. | |
| 2015/0133185 A1 | 5/2015 | Chen et al. | |
| 2015/0263816 A1 | 9/2015 | Hinman et al. | |
| 2015/0334575 A1 | 11/2015 | Joshi et al. | |
| 2015/0381291 A1 | 12/2015 | Mahajan et al. | |
| 2016/0126988 A1 | 5/2016 | Mester et al. | |
| 2016/0127009 A1 | 5/2016 | McMeekin et al. | |
| 2016/0127110 A1 | 5/2016 | McMeekin et al. | |
| 2016/0128010 A1 | 5/2016 | McMeekin et al. | |
| 2016/0156750 A1 | 6/2016 | Zhang et al. | |

OTHER PUBLICATIONS

Final Office Action from U.S. Appl. No. 14/924,309, dated Oct. 6, 2017, 25 pages.

* cited by examiner

DYNAMIC AND FLEXIBLE CHANNEL SELECTION IN A WIRELESS COMMUNICATION SYSTEM

CROSS REFERENCE TO RELATED APPLICATION

This application claims the benefit of U.S. Provisional Application Ser. No. 62/072,285 filed on Oct. 29, 2014 and entitled Dynamic And Flexible Channel Selection In A Wireless Communication System, which is incorporated herein by reference in its entirety and for all purposes.

BACKGROUND

Wireless communication networks are known and commercially available. Some wireless networks include highly-configurable broadband transceivers that operate in remote areas, sometimes with high or unpredictable interference. There exists a need for radios and methods of operation that flexibly allocate channel frequencies and bandwidths, monitor the performance of those channels, and dynamically change the channels if needed.

SUMMARY

Embodiments of the invention include a method for a downlink transmitter radio to automatically determine transmission parameters, and can include: (1) monitoring the spectral content of a range of frequencies, (2) identifying, based on the monitored spectral content, spectral characteristics associated with noise or interference, and (3) determining the downlink transmission channel carrier frequency and channel frequency bandwidth based on the spectral characteristics of the interference together with operating requirements of the wireless transmission system.

DESCRIPTION OF THE INVENTION

Figure 1:
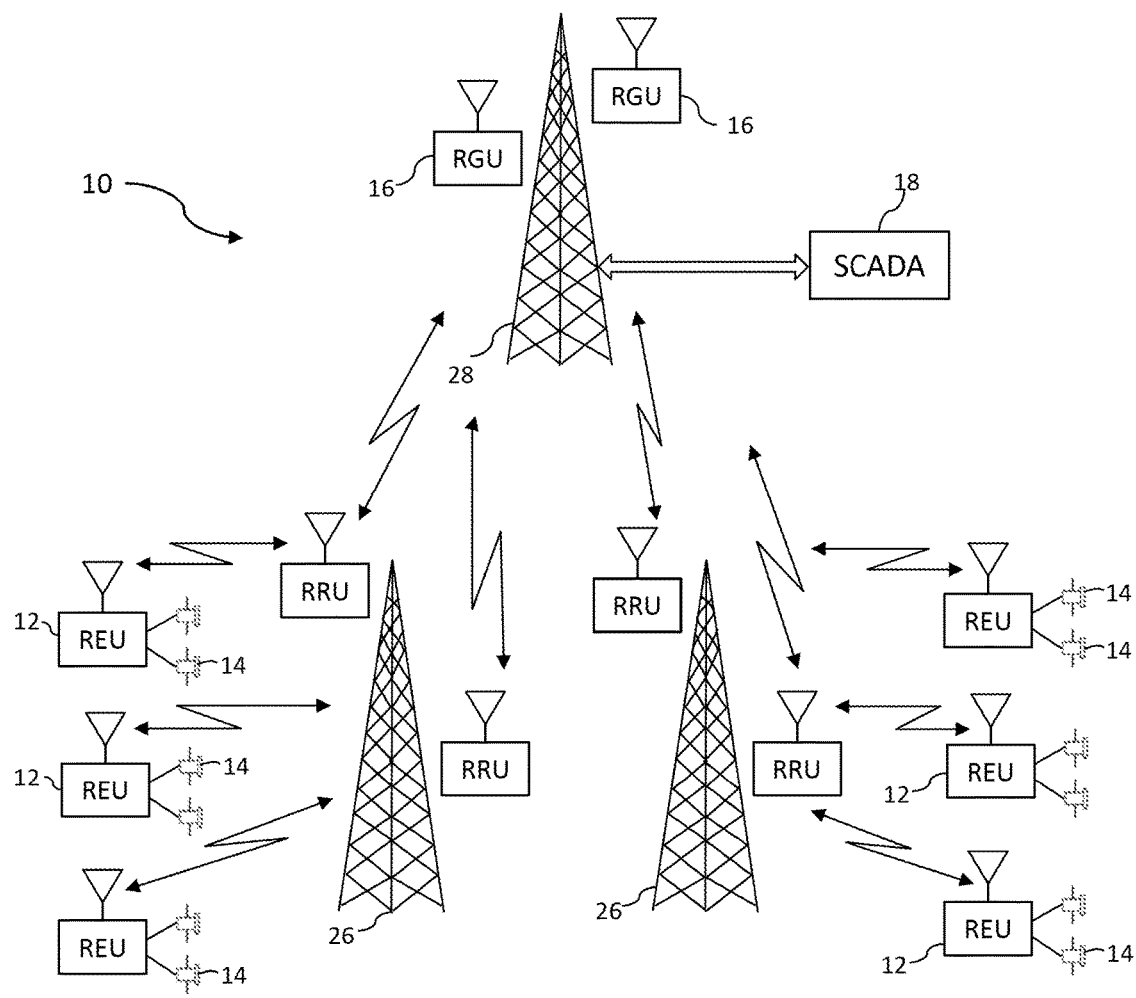
FIG. 1 is a diagrammatic illustration of a wireless communication system in accordance with embodiments of the invention.

FIG. 1 is a diagrammatic illustration of a wireless communication system 10 in accordance with embodiments of the invention. As shown, system 10 includes a plurality of radios such as radio endpoint units (REUs) 12, each of which is connected to one or more sensors 14. Data or other information collected by sensors 14 is transmitted by the REUs 12 to one or more remote radios such as radio gateway units (RGUs) 16, which can be connected (e.g., by conventional wired communication networks) to a system 18 such as supervisory control and data acquisition system (SCADA) that uses the collected data (e.g., for process control or information management). Applications of wireless communication system 10 include, for example, oil and gas field management, water and wastewater management, and location tracking. When an REU 12 is within wireless transmission range of the RGU, the REU 12 may communicate directly with the RGU16, without using an intermediate radio repeater unit (RRU) 20 to repeat the signal en route. In the illustrated embodiment, the REUs 12 wirelessly communicate with the RGUs 16 through radio repeater units (RRUs) 20. The REUs 12 may not have access to an AC power supply, and may operate on a limited power supply, such as a solar-charged battery or other battery with a finite life.

Figure 2:
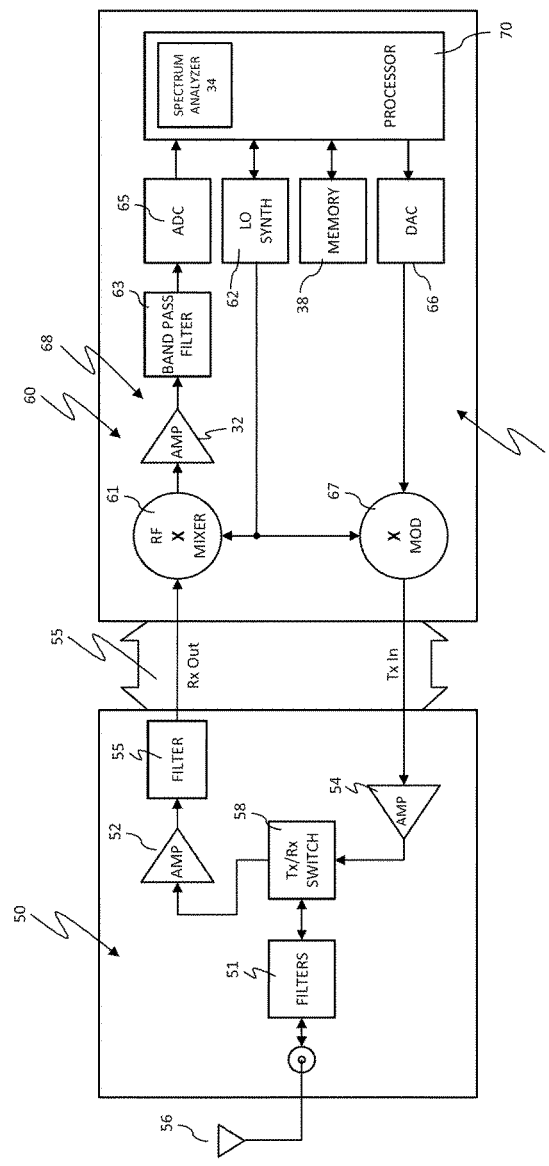
FIG. 2 is a diagrammatic block diagram of portions of a broadband radio receiver in accordance with embodiments of the invention.

FIG. 2 is a diagrammatic illustration of a superheterodyne broad band transceiver 40 with a receiver having an agile intermediate frequency for interference mitigation in accordance with embodiments of the invention. As shown, transceiver 40 may represent an RGU, RRU, or REU. Applications of transceivers 40 include, for example, oil and gas field management, water and wastewater management, location tracking and machine-to-machine (M2M) applications.

One embodiment of transceiver 40 is configured as a time division multiple access (TDMA) radio that operates at one of a wide range of carrier frequencies such as 100 MHz-6 GHz, with varying channel bandwidths such as 6.25 KHz-10 MHz. Other embodiments of the invention operate at other frequency bands, other channel bandwidths and/or at multiple carrier frequencies, and can be configured with other physical layers and hardware structures than those depicted in the preferred embodiment.

In an embodiment, the transceiver 40 may use a time division multiple access (TDMA) method of channel access. Other embodiments of the invention are configured with other channel access methods such as code division multiple access (CDMA) and frequency division multiple access (FDMA). Transceiver 40 can use any suitable modulation scheme such as BPSK (binary phase-shift keying), QPSK (quadrature phase-shift keying), 16 QAM (quadrature amplitude modulation), 64 QAM, FSK, Spread spectrum, OFDM, and the like. In embodiments, the transceiver 40 can dynamically select modulation schemes based on factors such as desired data transmission rates, available channel bandwidth and interference levels.

Transceiver 40 includes a radio frequency (RF) front end (RFFE) 50 coupled to modem module (MM) 60 by a connector 55. The RFFE 50 is configured for operation at a specific carrier frequency band. Accordingly, the RFFE 50 includes band-specific receive (Rx) and transmit (Tx) low noise amplifier 52 and and power amplifier 54, respectively, coupled to an antenna 56 through a receive/transmit (Rx/Tx) switch 58. RFFE 50 can also include band-specific filters such as those shown at 51 and 55. The RFFE 50 is interchangeable with RFFEs capable of handling different carrier frequency bands.

The MM 60 is configured for wide-band operation with any of the carrier frequency-specific RFFEs. MM 60 includes a receiver section 68, a transmitter section 69, and processor 70. The receiver section 68 is a superheterodyne receiver and includes an RF mixer 61, an intermediate frequency (IF) stage that includes in the illustrated embodiment intermediate frequency amplifier 32 and band pass filter 63, and analog-to-digital converter (ADC) 65. Transmitter section 69 includes digital-to-analog converter (DAC) 66 and IQ modulator 67. The RF mixer 61 and modulator 67 are driven by a local oscillator (LO) synthesizer 62 that is coupled to the processor 70 in the illustrated embodiment. A received RF signal is received at antenna 56, and after initial processing in the RFFE 50, is coupled to the RF mixer 61 in MM 60. The RF mixer 61 and the local oscillator 62 shift the received RF data signal to an intermediate frequency (IF). In one embodiment the intermediate frequency is nominally 140 MHz, and the received RF signals are band pass filtered by a band pass filter 63 having a 10 MHz pass band (14 MHz filter with half-power frequency at 10 MHz) centered at 140 MHz. The pass band and center frequency of band pass filter 63 are different in other embodiments. Processor 70, which is a digital signal processor (DSP) in embodiments, shifts the RF signals to the channel base band, demodulates the signal, and performs other digital signal processing functions. Processor 70 further includes a spectrum analyzer 34.

Processor 70 is coupled to memory 38. Data defining the specific functions and subprocesses implemented by the processor 70, including control and signal processing programs and algorithms, as well as data or other information generated or used by the processor, can be stored in memory 38. Processor 70 performs receive signal processing, transmit signal processing and control functions. For example, the processor 70 performs an IF mixer function to shift the digital signal from the intermediate frequency to the channel base band, and demodulate those signals. Base band transmit signals produced by the processor 70 are converted to analog form by DAC 66 and modulated onto the carrier by IQ modulator 67. The modulated RF transmit signals are then outputted to the RFFE 50 for transmission.

Although the only transmissions depicted in FIG. 2 between the RFFE and MM are the receiver output (Rx Out) from the RFFE to the MM and transmitter input (Tx In) from the MM to the RFFE, other signals (e.g., a control signal to the receive/transmit switch 58) are coupled between the RFFE 50 and MM 60 by the connector 55.

It should be understood that FIG. 2 is a block diagram representing certain radio components relevant to the present invention. Not all components of the radio are depicted in FIG. 2; however, a person of with ordinary skill in the relevant art will be familiar with designs for the components not depicted sufficient to make and use the present invention.

Figure 3:
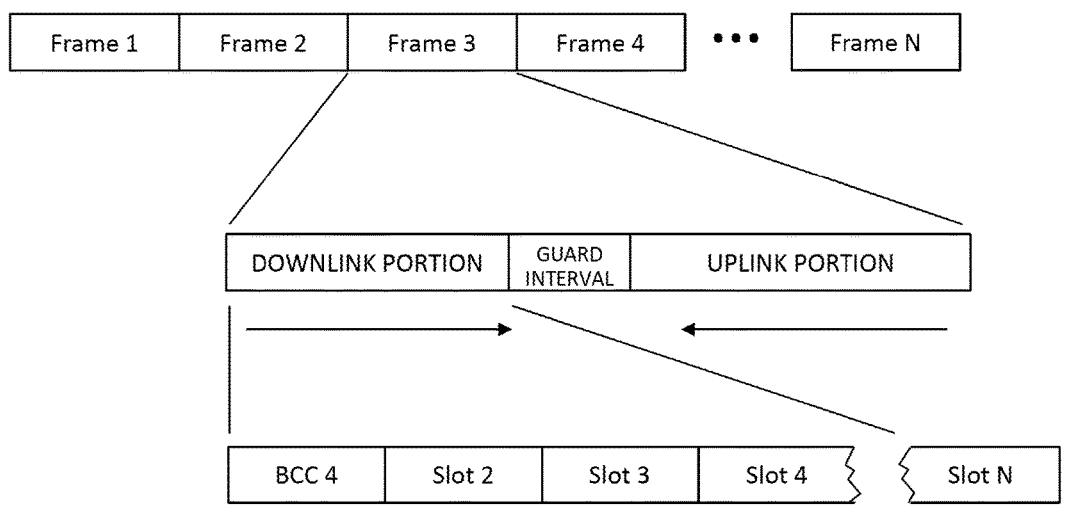
FIG. 3 is a diagrammatic illustration of an uplink/downlink communication frame structure of that can be used by the communication system shown in FIG. 1.

As illustrated in FIG. 3, in a TDMA embodiment of a wireless communication system, the wireless communications between REUs 12 and RGUs 16 can be organized into sequential frames. In an embodiment, each frame includes a time division duplexed (TDD) downlink portion and uplink portion separated in time by a guard band. During operation, one radio (a downlink transmitter, e.g., an RGU) transmits data during the downlink portions of the frames, and other radios communicating with that radio (uplink transmitters, e.g., REUs) transmit data during the uplink portions of the frames. RRUs may serve as both downlink and uplink transmitters because they transmit uplink portions with respect to an associated RGU and transmit downlink portions with respect to associated REUs. For purposes of the examples herein, transmissions by RGUs 16 are referred to as the downlink frame portions and are received by REUs 12. By this convention, transmissions by REUs 12 are referred to as the uplink frame portions and are received by RGUs 16.

Both the downlink and uplink frame portions include a plurality of subframes, or slots, that contain specific types of information, including a beacon signal, control information, and data. During operation, the RGU 16 transmits beacon signals, control information, and data to REUs 12 in the downlink slots. When an REU 12 has data or information to send to the RGU 16, the REU 12 may transmit a Request for Channel message in order to request permission from the RGU 16 to utilize one or more uplink slots. If the RGU 16 grants the request, the REU 12 may transmit the desired information in the designated uplink slot(s). In this fashion, one or more REUs 12 may communicate during normal operation with an RGU 16.

As described above, the radios (REUs, RGUs, and RRUs) in wireless communication system 10 are highly configurable, having the ability to operate, for example, with a variety of transmission characteristics, including different frequencies, channel widths, power levels, and modulation schemes, depending on the design requirements of the wireless communication system. For example, systems in an environment with a high noise floor or interference at lower frequencies may be required to operate at higher frequencies in the 2.4 or 5 GHz range. Similarly, systems requiring radios with small form factors may be required to operate at higher frequencies where smaller antennas are more efficient. Alternatively, systems operating in physically cluttered environments or over long distances may require lower frequency bands. Systems requiring high cumulative data throughput (e.g., large volumes of REUs, each requiring low data rates, or low volumes of REUs, each requiring higher data rates) may require wide channels. In a power-constrained system, where radio batteries sometimes need to last for years, transmission power may be limited, leading to slower transmission rates, whereas higher data volume requirements may require higher power. Analogously, high data throughput requirements may require modulation schemes with high spectral efficiencies, whereas noisy environments or reliability requirements may require modulation schemes with low spectral efficiencies.

Figure 4:
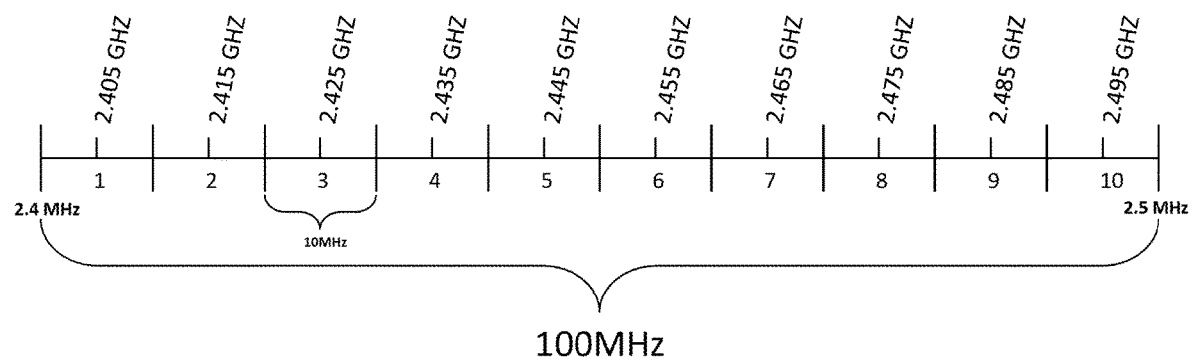
FIG. 4 is a diagrammatic illustration of a radio scanning a carrier frequency band.

In an embodiment of a wireless communication system 10, prior to commencing data transmission, the downlink transmitting radio (e.g. RGU) measures the characteristics of the wireless environment and determines the best set of operating parameters for wireless transmissions in the present environment. For example, an RGU performs spectrum analysis across the entire available frequency band to determine the frequency and power of interference. In an embodiment, a radio scans a frequency band as depicted in FIG. 4. FIG. 4 shows a frequency band starting at 2.4 GHz, which is typically an unlicensed range of frequencies. For simplicity, the band is depicted as 100 MHz wide and spans from 2.4 GHz to 2.5 GHz. A radio (e.g., RGU, RRU, REU) in an embodiment has a digital spectrum analyzer capable of detecting power of wireless signals across a 10 MHz range of frequencies simultaneously. To scan the 100 MHz within the 2.4-2.5 GHz band, therefore, the radio must separately analyze each of the 10 MHz sub-bands (labeled 1-10 in FIG. 4). In an embodiment, the radio first analyzes the sub-band labeled 1, which has a center frequency of 2.405 GHz. To analyze sub-band 1, the radio uses the local oscillator (62 in FIG. 2) and the RF mixer (61 in FIG. 2) to adjust the 2.405 GHz frequency down to the radio's 140 MHz intermediate frequency (IF). The band pass filter (63 in FIG. 2) then filters the received IF signal to a 10 MHz-wide signal. The analog signal is converted to digital (65 in FIG. 2) and passed to the spectrum analyzer (38 in FIG. 2) in the digital signal processor (70 in FIG. 2). The spectrum analyzer detects the energy levels and frequencies of signals within the 10 MHz sub-band and records the detected data in memory (38 in FIG. 2). After listening to sub-band 1 for a predetermined period of time, the local oscillator and RF mixer adjust the next sub-band 2, centered at 2.415 GHz, to the IF of 140 MHz, and the spectrum analyzer analyzes and stores the energy levels in this sub-band. In this manner, the radio passes through each of the 10 sub-bands until each is analyzed by the spectrum analyzer at least once. This is one example of a wide-band radio efficiently analyzing a frequency band for interference and recording the results to be used as an input to an algorithm to select optimal operating parameters, which may include, for example: transmit power level, time slot duration, channel frequencies, modulation, and FEC coding.

The RGU then performs an algorithm using the collected data, together with pre-configured system requirement information (e.g., data throughput requirements, quality of service requirements, and maximum operating power) to select the best set of operating parameters given the collected data and system requirements. For example, the RGU may include a system capacity optimization algorithm. The algorithm evaluates the system requirement information and uses it to form a system capacity metric. This algorithm will have statistical metrics based on the variances and co-variances of interference measurements. In an embodiment, after determining the system operating requirements, the RGU then uses these parameters to transmit to other radios in the wireless network, and the other radios are programmed to automatically detect the RGU's signals and join the network.

The RGU optionally performs this interference measurement and algorithm periodically during operation to ensure on an ongoing basis that it is using optimal parameters for data communication in the wireless environment. If the RGU determines that the parameters in use are no longer optimal, then the RGU transmits new parameters to the other radios in the network with instructions to switch to the new parameters at a pre-determined time. For example, the RGU may transmit the new parameters through a control message, which may be either a pre-provisioned slot, or as a message type multiplexed on the control slot. In an embodiment, the message may specify the frame number when the new parameters will be instituted.

In an embodiment, all radios in a wireless communication system are pre-configured with default operating parameters, and use those values to establish initial communication prior to calculating more optimal parameters based on the interference measurement and system requirements, and instructing the other radios to switch to the more optimal parameters. The default transmission parameters for the radios may differ from the default receiver parameters. For example, the REUs must be programmed to receive using the parameters for which the RGU is programmed to transmit, and vice versa. Optionally, all radios may use the same default parameters for both transmitting and receiving.

In another embodiment of a wireless communication system 10, the downlink transmitter (e.g., RGU) performs the analysis (e.g., measuring the interference and performing an algorithm) to determine its own best communication parameters, and stores ranked lists of its preferred parameters in memory. In addition, each uplink transmitter (e.g., REU) performs the same or similar measurements and algorithm to determine its own best communication parameters, and also stores ranked lists of its preferred parameters in its memory. Each uplink transmitter then transmits its ranked lists of parameters to the downlink transmitter (e.g., in a control channel using default transmission parameters), which stores the ranked lists of parameters not only for itself, but also for all uplink radios. The downlink transmitter then synthesizes the data from its own measurements as well as the data from all uplink transmitters and determines the overall best parameters for the wireless communication system. After determining the best overall operating parameters, the downlink transmitter sends the best parameters to all uplink transmitters (e.g., in a control channel using default transmission parameters) along with instructions to switch to those parameters at a predetermined time.

Figure 5:
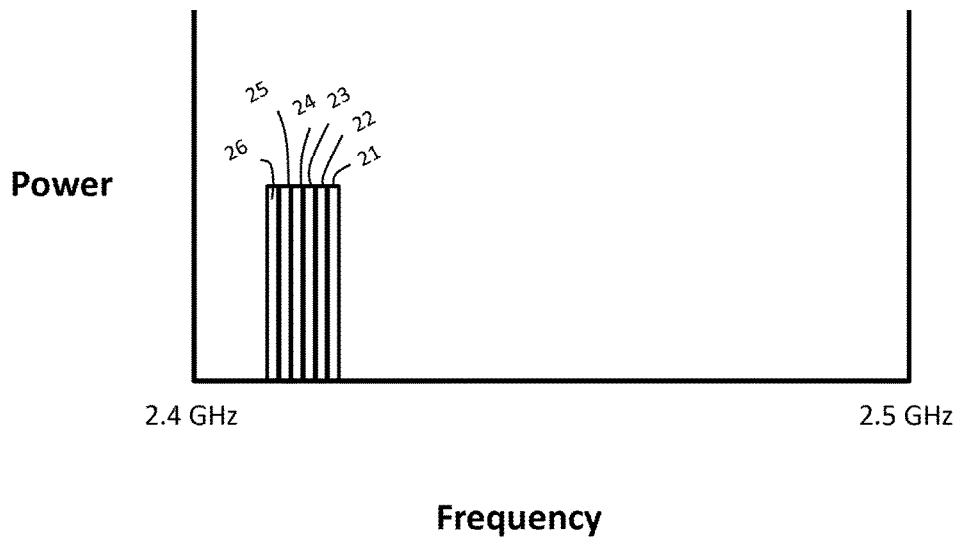
FIG. 5 is a diagrammatic illustration of multiple allocated channels within a frequency band.

In an embodiment, an RGU may assign different transmit and receive parameters to different REUs. For example, the RGU may experience interference at a frequency different from interference experienced by the REUs. In that scenario, using FIG. 5 as a reference, the RGU transmits on a channel 26 that is absent interference at the locations of the REU locations, but instructs the REUs to transmit on a channel 21 that is absent interference at the location of the RGU. In another embodiment, the RGU may transmit to different REUs using different parameters. For example, the RGU may use different channels 21-25 or power levels or modulation schemes to transmit to different REUs, depending on the operating environment of each REU.

Figure 6:
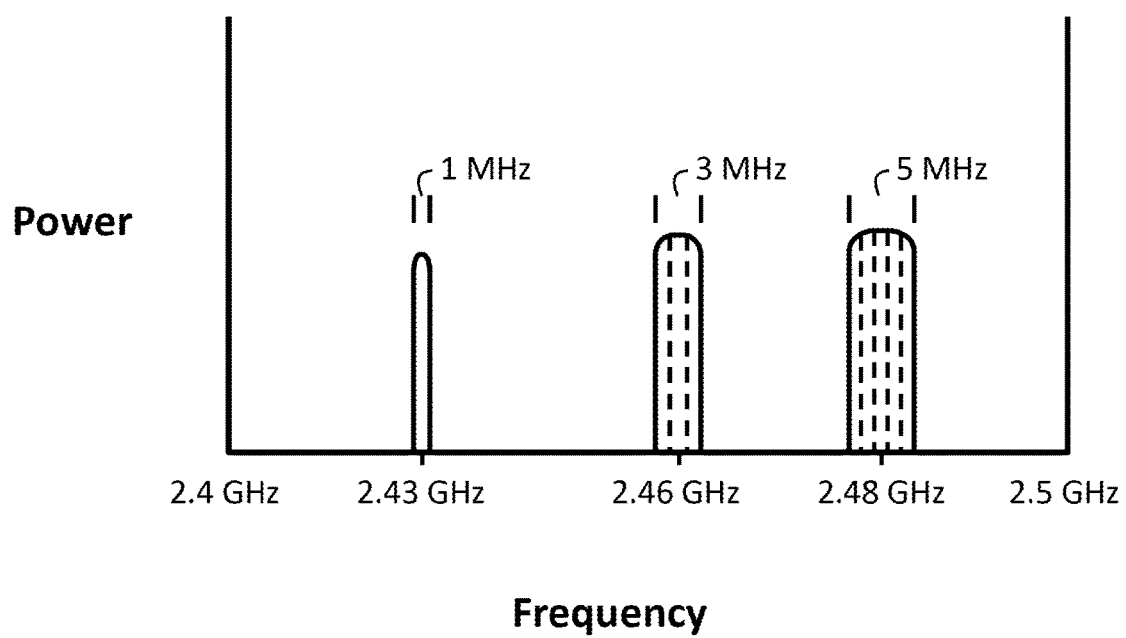
FIG. 6 is a diagrammatic illustration of channels allocated with different bandwidths within a frequency band.

In an embodiment, an RGU may select and/or change the channel bandwidth optimal based on the circumstances of the wireless communications network. For example, referring to FIG. 6, in an environment with interference spread across many frequencies within the available band, the RGU may only be able to find narrow frequency ranges (e.g., 1 MHz-wide channels or less) that are relatively clear of interference. In that situation, The RGU use interference data gathered from itself and REUs to select one or more narrow channels that fall within those narrow frequency ranges that are free of interference. The RGU and REUs may then communicate across multiple narrow channels (e.g., using one or more channels for downlinks and one or more channels for uplinks) so as to maximize throughput even in areas of high interference. In the event that interference is located in more limited portions of the band at the RGU and REUs, the RGU may allocate wider channels, permitting higher data throughput. For example, referring to FIG. 6, the RGU may allocate a 3 MHz-side channel or 5 MHz-wide channel. As with the prior embodiment, the same channel may be used for both downlink and uplink transmissions, or different channels may be used by different downlink and uplink transmitters.

The radios in a wireless communication network may dynamically change from one channel bandwidth to another based not only on the presence or absence or interference, but also based on other dynamic requirements. For example, the RGU may have a large amount of data to broadcast, or an REU may notify the RGU that the REU has a large amount of data to send. Upon learning of the high data transmission requirements, the RGU may temporarily allocate a wider channel bandwidth than the default until the data has been transmitted and successfully received. This temporary allocation of additional bandwidth allows the default channel width to remain narrow, thus reducing the overall interference on the network.

The radios in a wireless communication network may also dynamically change other operating parameters. For example, if an RGU consistently experiences errors in data received from a specific REU, the RGU may instruct the REU to increase power for a predetermined amount of time. If an REU consistently experiences errors in data received from the RGU, the REU may request that the RGU decrease its modulation rate. Similarly, if the spectrum analyzer detects interference but determines the power of the interference in a desired channel is low, then the RGU may increase its power to transmit at a higher power than the interferer.

Using the scanning, ranking, and negotiation techniques described herein, the radios in a wireless communication network may negotiate and change a variety of parameters associated with wireless transmissions. Although the invention has been described with reference to preferred embodiments, those of skill in the art will recognize that changes can be made in form and detail without departing from the spirit and scope of the invention.

The invention claimed is:

1. A method for a downlink transmitter radio to automatically determine transmission parameters, comprising:
   monitoring, at the downlink transmitter, the spectral content of a range of frequencies;
   identifying, at the downlink transmitter and based on the monitored spectral content, spectral characteristics including frequency and power associated with noise or interference;
   determining, at the downlink transmitter, downlink transmission channel carrier frequency and channel frequency bandwidth parameters based on the spectral characteristics of the interference together with operating requirements of the wireless transmission system; and
   determining, at the downlink transmitter, channel carrier frequency or channel frequency bandwidth parameters for one or more uplink transmitters based on the spectral characteristics of the interference together with the operating requirements of the wireless transmission system.

2. The method of claim 1 and further including determining the downlink transmitter channel carrier frequency or channel frequency bandwidth based on information obtained from one or more uplink transmitters.

3. The method of claim 1 and further including sending, from the downlink transmitter, channel carrier frequency or channel frequency bandwidth parameters to one or more uplink transmitters for use in subsequent wireless communications.

4. The method of claim 1 and further including changing the channel carrier frequency or channel frequency bandwidth parameters of the uplink or downlink transmitters based on changes in the operating environment.

5. The method of claim 1 and further including changing the channel carrier frequency or channel frequency bandwidth parameters of the uplink or downlink transmitters based on changes in the requirements of the wireless communication system.

6. The method of claim 1 and further including determining the power levels for one or more of the downlink or uplink transmitters based on the spectral characteristics of the interference together with other operating requirements of the wireless transmission system.

7. The method of claim 1 and further including changing the power levels for one or more downlink or uplink transmitters based on changes in the operating environment or changes in the requirements of the wireless communications system.

8. The method of claim 1 and further including determining the modulation scheme for one or more downlink or uplink transmitters based on the spectral characteristics of the interference together with other operating requirements of the wireless transmission system.

9. The method of claim 1 and further including changing the modulation scheme for one or more downlink or uplink transmitters based on changes in the operating environment or changes in the requirements of the wireless communications system.

10. The method of claim 1 and further including determining the forward error correction coding rate for one or more downlink or uplink transmitters based on the spectral characteristics of the interference together with other operating requirements of the wireless transmission system.

11. The method of claim 1 and further including changing the forward error correction coding rate for one or more downlink or uplink transmitters based on changes in the operating environment or changes in the requirements of the wireless communications system.

12. The method of claim 1 and further including one or more uplink transmitters analyzing the operating environment and ranking the available channel carrier frequencies and/or channel frequency bandwidths and sending a ranked list of channel carrier frequencies and/or channel frequency bandwidths to the downlink transmitters.

13. The method of claim 12 and further including the downlink transmitters analyzing the one or more ranked list of channel carrier frequencies and/or channel frequency bandwidths received from the uplink transmitters and using the ranked list to further determine the downlink transmitter transmission channel carrier frequencies and/or channel frequency bandwidths.

14. The method of claim 1 and further including transmitting, from the downlink transmitter, a signal using the determined downlink transmission channel carrier frequency and channel frequency bandwidth parameters.

15. The method of claim 1 wherein determining downlink transmission channel carrier frequency and channel frequency bandwidth parameters includes determining the parameters based on system capacity optimization.

16. A radio configured to operate in accordance with the method of claim 1.

* * * * *